United States Patent [19]

Börjesson

[11] Patent Number: 4,640,399
[45] Date of Patent: Feb. 3, 1987

[54] AXIALLY ENGAGING TWIN PLATE FRICTION CLUTCH WITH ADJUSTMENT MEANS

[75] Inventor: Tore L. Börjesson, Varberg, Sweden

[73] Assignee: AB Volvo, Gothenburg, Sweden

[21] Appl. No.: 668,988

[22] Filed: Nov. 6, 1984

[30] Foreign Application Priority Data

Nov. 8, 1983 [SE] Sweden ............................... 8306131

[51] Int. Cl.$^4$ ............................................ F16D 13/52
[52] U.S. Cl. ................................. 192/70.25; 188/71.7
[58] Field of Search ............ 192/109 R, 70.21, 70.25, 192/70.28, 70.27, 110 R, 111 A, 111 R; 188/71.7

[56] References Cited

U.S. PATENT DOCUMENTS

| | | | |
|---|---|---|---|
| 2,257,877 | 10/1941 | Binder | 192/70.28 |
| 2,385,517 | 9/1945 | Hunt . | |
| 2,812,046 | 11/1957 | Taylor | 192/111 B |
| 3,554,342 | 1/1971 | Spokas | 192/70.28 X |
| 3,561,577 | 2/1971 | Binder | 192/70.28 X |
| 4,257,502 | 3/1981 | Riese | 192/70.25 |

FOREIGN PATENT DOCUMENTS 1456149 11/1976 United Kingdom .

Primary Examiner—George H. Krizmanich
Attorney, Agent, or Firm—Young & Thompson

[57] ABSTRACT

A vehicle clutch assembly comprising a clutch housing which can be connected to a flywheel, twin clutch plates which can be connected to an output shaft, an intermediate plate which is arranged to press the one clutch plate against a surface on the flywheel and which is coupled to the clutch housing via axially acting plate springs, and a pressure plate which is arranged to press the other clutch plate against the intermediate plate and which is spring-biassed in a direction toward it. Structure is connected to the intermediate plate for centering it between the clutch plates when the clutch is disengaged. The plate springs are arranged to bias the intermediate plate in a direction toward that one clutch plate. The centering structure is arranged between the pressure plate and the intermediate plate so that—departing from an engaged clutch—the pressure plate, when disengaging the clutch, is movable through a given limited distance in the clutch-disengaging direction prior to moving the intermediate plate.

5 Claims, 4 Drawing Figures

AXIALLY ENGAGING TWIN PLATE FRICTION CLUTCH WITH ADJUSTMENT MEANS

The present invention relates to a vehicle clutch assembly of the kind which comprises a clutch housing which can be connected to a flywheel, two clutch plates which can be connected to an output shaft, an intermediate plate which is arranged to press the one clutch plate against a surface on the flywheel and which is coupled to the clutch housing via an axially acting spring means, a pressure plate which is arranged to press the other clutch plate against the intermediate plate and which is spring-biassed in a direction theretowards, disengaging means for moving the pressure plate away from said clutch plate, and means connected to the intermediate plate for centering said intermediate plate between the clutch plates when the clutch is disengaged.

In a known vehicle clutch assembly of the aforedescribed kind, which with most twin-plate friction clutch assemblies is intended for heavy vehicles, such as trucks and lorries, the intermediate plate is biassed by plate springs towards the rearwardly located clutch plate. Centering means, in the form of finger-like elements connected with the intermediate plate engage with axial clearance in grooves located in the clutch housing and limit the movement of the intermediate plate in the clutch disengaging direction. Consequently, when disengaging the clutch, the springs urge the intermediate plate rearwardly out of frictional engagement with the forward clutch plate. The force which must be generated by the springs, however, in order to ensure that the intermediate plate is moved rearwardly under all conditions, is of such high magnitude that the clutch plates become unevenly worn. The reason for this is that when the pressure plate has moved the rearwardly located clutch plate into contact with the intermediate plate, as the clutch is engaged, a relatively large torque is generated in the friction surface of the clutch plate, due to the holding force exerted by the springs, before the intermediate plate is moved forwards towards the forwardly located clutch plate. In turn, this torque produces large forces in the splined coupling between the clutch plate and the output shaft, which in the event of unfavourable frictional values in the splined coupling can result in a self-restraining action therein. The result is that the clutch plates cannot be moved axially, and that all load must be taken up by the rearwardly located clutch plate, which therefore becomes worn earlier than the forward clutch plate.

The object of the invention is to provide a vehicle clutch assembly of the aforesaid kind which is designed to solve the aforementioned problems relating to the uneven take-up of torque and the uneven wear on the clutch plates.

This object is realized in accordance with the invention by arranging for the spring means acting between the clutch housing and the intermediate plate to bias said intermediate plate in a direction towards the first clutch plate, and by providing the centering means, between the pressure plate and the intermediate plate, with dogging means so arranged that—departing from a fully engaged clutch—the pressure plate, when disengaging the clutch, is movable through a given limited distance in the clutch-disengaging direction prior to dogging of the intermediate plate.

In the clutch assembly according to the invention, the direction in which the forces exerted by the springs act upon the intermediate plate is reversed in relation to that of the known clutch assembly, and dogging means are arranged between the pressure plate and the intermediate plate. When engaging the clutch, the pressure plate and the intermediate plate initially move synchronously with one another at a constant distance apart. When the intermediate plate has engaged the forward clutch plate and moved the same forwards into contact with the friction surface on the flywheel, the pressure plate, as a result of the clearance between said plate and the dogging means, can move further forwards through a short distance, to complete engagement of the clutch, by finally pressing the clutch plates and the intermediate plate between the flywheel and the pressure plate.

The invention will now be described in more detail with reference to an embodiment thereof illustrated by way of example in the accompanying drawings, in which FIG. 1 is a longitudinal sectional view of one embodiment of a clutch according to the invention in a clutch engaged position;

Figure 1:
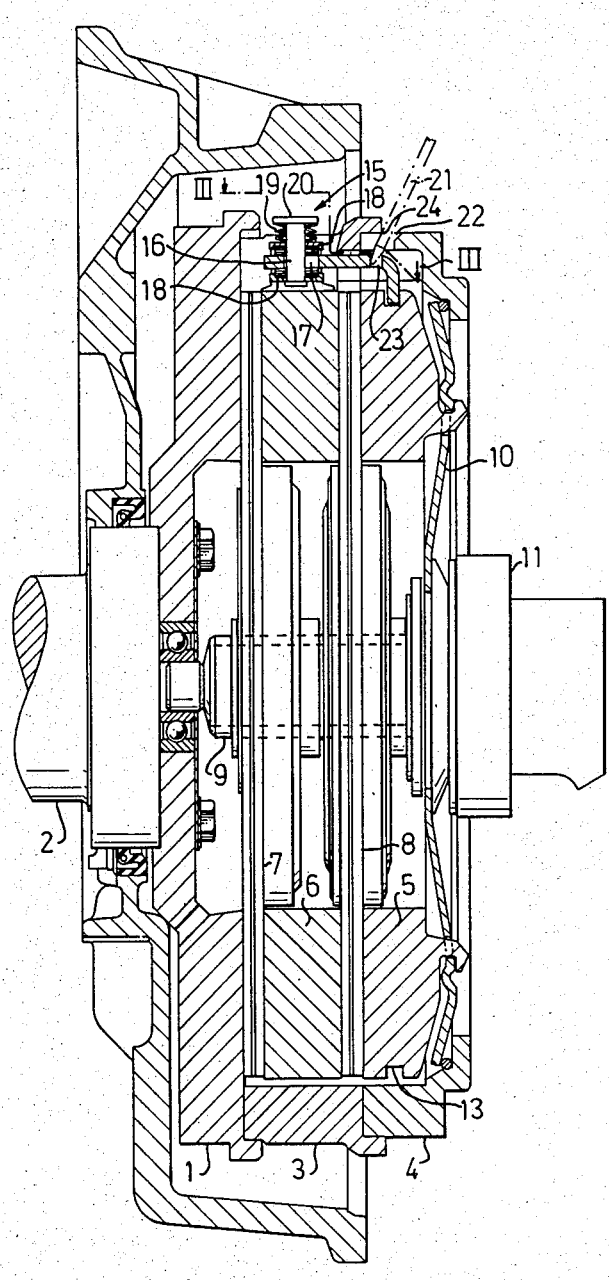
Figure 3:
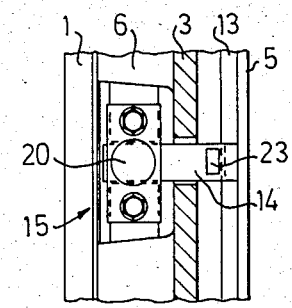
FIG. 3 is a view taken on the line III—III of FIG. 1.
Figure 2:
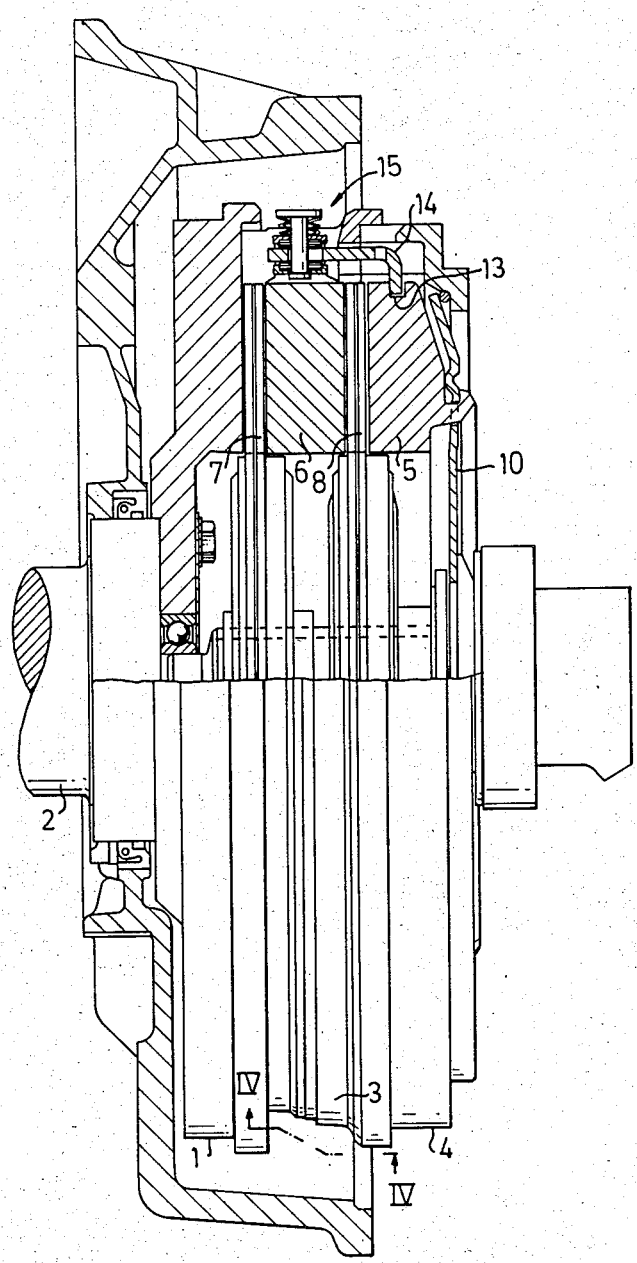
FIG. 2 illustrates the clutch of FIG. 1 when disengaged.

In FIGS. 1 and 2 the reference 1 identifies a flywheel which is screwed firmly onto the crankshaft 2 of an engine. Firmly connected to the flywheel with the aid of bolts (not shown) is a clutch housing which comprises two mutually connected sections 3 and 4. The clutch housing 3,4 encloses a pressure plate 5, an intermediate plate 6, and a forward and a rearward clutch plate 7 and 8, both of which are joined by means of a spline coupling to an output shaft 9 (input shaft to the gearbox). The pressure plate is coupled to the clutch housing in a conventional manner for relative axial, but not relative rotational movement, and is biassed towards the flywheel by means of a cup-spring, or Belleville spring 10, which engages a clutch-disengaging bearing 11. By moving the clutch-disengaging bearing 11 away from the flywheel 1, with the aid of a clutch-disengaging fork (not shown), the pressure plate 5 is moved from the clutch-engaging position illustrated in FIG. 1, to the clutch-disengaging position illustrated in FIG. 2.

Figure 4:
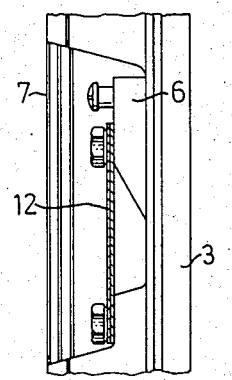
FIG. 4 is a view taken on the line IV—IV of FIG. 2.

The intermediate plate 6 is connected to the clutch housing 3,4 by means of a plurality of peripherally distributed plate springs 12, of which one is shown in FIG. 4.

The springs 12 bias the intermediate plate 6 in a direction towards the flywheel.

The pressure plate 5 has provided thereon a peripheral groove 13, in which a plurality of fingers 14 engage, these fingers being uniformly distributed circumferentially. The fingers 14 are respectively joined to the intermediate plate 6 with the aid of a friction means, which is generally shown at 15 in FIG. 1 and which includes a pin 16 which extends, with clearance, through a hole 17 in the finger 14. Arranged on both sides of the finger are friction elements 18, which are urged against the finger 14 by means of cup springs 19 or Belleville spring washers placed beneath a head 20 on the pin 16.

As illustrated in FIGS. 1 and 2, there is a small axial clearance between respective fingers 14 and the groove 13 in the pressure plate. This clearance determines the play or free-travel between the rearward clutch plate 8 and the intermediate plate 6 and the pressure plate 5 respectively in the clutch-disengaged position. The purpose of the friction means 15 in this respect is to enable the intermediate plate 6 to be readily centered when assembling the clutch, i.e. to enable the finger 14 to be positioned relative to the rear edge of the groove 13 in such a manner that when the clutch is engaged there is clearance solely between the finger and forward edge of the groove, as illustrated in FIG. 1. The position of the finger 14 is set with the aid of a narrow tool 21, e.g. a screwdriver, which is inserted through a slot 22 in the clutch housing and into a hole 23 in the finger. By pressing the tool 21 against an edge 24 on the clutch housing, it is possible to move the finger rearwardly to the FIG. 1 position, against the action of frictional forces. By dimensioning the elements so that the force exerted by the spring 10 of the pressure plate is sufficient to overcome the frictional forces acting between the finger 14 and the friction means 15, the pressure plate, when required when engaging the clutch, is able to urge the finger 14 forwards, thereby to compensate automatically for wear on the clutch plates.

When engaging the clutch and the pressure plate 5 is released so as to move forwards from the clutch disengaged position shown in FIG. 2 towards the clutch engaged position shown in FIG. 1, the intermediate plate 6 will move forwards, under the action of the springs 12, synchronously with the pressure plate 5 through the distance required to eliminate the clearance between the forward clutch plate 7 and the flywheel 1 and the intermediate plate respectively. The final stage of the clutch engaging movement is then effected, in that the pressure plate is able to move further forwards through a short distance corresponding to the clearance between the fingers 14 and the groove 13. In this way, a practically uniform torque is built-up in the two clutch plates.

I claim:

1. A vehicle clutch assembly comprising a clutch housing which can be connected to a flywheel, twin clutch plates which can be connected to an output shaft, an intermediate plate which is arranged to press the one clutch plate against a surface on the flywheel and which is coupled to the clutch housing via axially acting plate springs, a pressure plate which is arranged to press the other clutch plate against the intermediate plate and which is spring-biassed in a direction theretowards, disengaging means for moving the pressure plate away from said clutch plate, and means connected to the intermediate plate for centering said intermediate plate between the clutch plates when the clutch is disengaged, the plate springs active between the clutch housing and the intermediate plate being arranged to bias the intermediate plate in a direction towards said one clutch plate; and the centering means including means so arranged between the pressure plate and the intermediate plate that—departing from an engaged clutch—the pressure plate, when disengaging the clutch, is movable through a given limited distance in the clutch-disengaging direction prior to moving the intermediate plate.

2. A clutch assembly according to claim 1, in the last named means comprise fingers which are connected with the intermediate plate and which engage with axial clearance in recesses in said pressure plate.

3. A clutch assembly according to claim 2, in which the fingers are adjustably connected positionwise with the intermediate plate in a manner which, when engaging the clutch, enables respective fingers to be brought into abutment with the side of the recess removed from the clutch plate such that there is clearance solely between the finger and the opposite side of the recess.

4. A clutch assembly according to claim 2, in which the connection of the respective fingers to the intermediate plate is a friction joint.

5. A clutch assembly according to claim 4, in which the clutch housing is provided opposite each finger with an opening in which a tool can be inserted for engagement with a recess in said finger, thereby to enable the finger to be moved in a direction towards the pressure plate, by pressing the tool against an edge of the clutch plate facing the opening.

* * * * *